United States Patent [19]

Miller et al.

[11] 4,028,698
[45] June 7, 1977

[54] DME APPARATUS AND METHOD

[75] Inventors: Wayne L. Miller, Stanhope; Ernest J. Carnicelli, Flanders, both of N.J.

[73] Assignee: The Cessna Aircraft Company, Wichita, Kans.

[22] Filed: Sept. 2, 1975

[21] Appl. No.: 609,647

[52] U.S. Cl. .................. 343/6.5 LC; 343/5 VQ; 343/7.3
[51] Int. Cl.² .......................................... G01S 9/56
[58] Field of Search ............. 343/5 VQ, 7.3, 6.5 R, 343/6.5 LC

[56] References Cited
UNITED STATES PATENTS

| 3,281,839 | 10/1966 | Triest et al. | 343/5 VQ X |
| 3,412,397 | 11/1968 | Evans | 343/5 VQ |
| 3,646,588 | 2/1972 | Popta | 343/7.3 |
| 3,836,964 | 9/1974 | Evans | 343/5 VQ X |
| 3,940,762 | 2/1976 | Ethington et al. | 343/5 VQ |

Primary Examiner—Malcolm F. Hubler
Attorney, Agent, or Firm—Beveridge, DeGrandi, Kline

[57] ABSTRACT

A DME apparatus and method for determining the distance of an aircraft from a ground station and the groundspeed thereof. Replies to the transmitting aircraft are distinguishd from replies to other aircraft and squitter by digitally storing information indicative of the times of receipt of all replies received during a first cycle and determining whether any of the stored times are identical to the times of receipt of replies received during the cycles following the first cycle for a predetermined number of successive cycles. If this criterion is met distance information is derived and displayed and a range gate is generated and combined with incoming replies. If replies fall within the range gate for at least a predetermined percentage of cycles then the apparatus is switched into the track state in which all replies are ANDed with the range gate before storage and the coincidence determination is effected. Also, in track the predetermined number of successive cycles necessary for distance information to be derived is reduced. An apparatus for detecting groundspeed from DME distance signals having an initialization capability.

26 Claims, 10 Drawing Figures

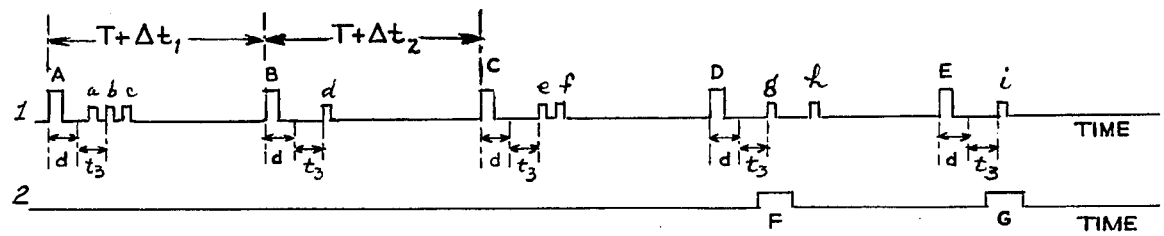
_Fig. 1_
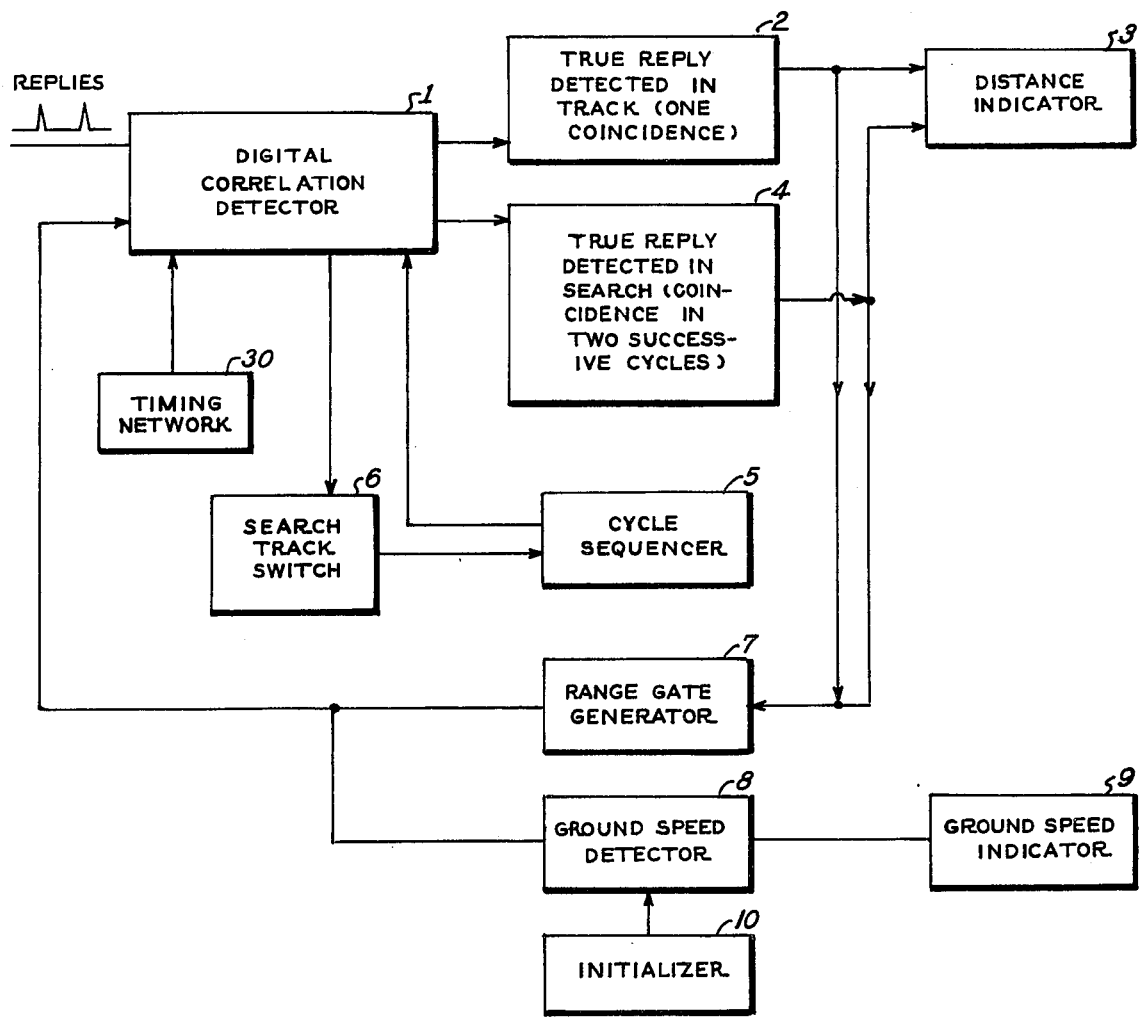
_Fig. 2_

CYCLE SEQUENCER & VALID REPLY DETECTOR

RANGE GATE GENERATOR & SEARCH/TRACK SWITCH

RANGE GATE CHANGE OF POSITION DETECTOR &
GROUND SPEED VOLTAGE GENERATOR

DME APPARATUS AND METHOD

The present invention relates to an improved system and method for determining the range of an aircraft with respect to a DME station as well as the speed of the aircraft.

By way of background the DME (Distance Measuring Equipment) concept is an extension of radar ranging, and DME equipment has found widespread acceptance and usage in commercial aviation. According to the basic DME scheme, each ground station in an area is allotted a specific frequency and aircraft within the transmitting range of the ground station transmit information to the station on that frequency. The information is received at the ground station, which in response thereto, transmits information back to the aircraft on a different frequency. After decoding the received information and subtracting system delay, the time elapsed between the transmission of information by the aircraft and the receipt of the reply information is measured and is proportional to the distance of the aircraft to the ground station.

The information transmitted is a pulse train. Following a predetermined delay after the receipt of each interrogation pulse, the ground station emits a reply pulse to the interrogating aircraft. Since the ground station may be emitting replies to the transmitted pulses of several aircraft within the range of the station, each aircraft will receive replies not only to its own interrogation pulse, but to the interrogation pulses of other aircraft as well. Additionally, in order to make the information pulse output of the ground station periodic, the ground station also emits squitter pulses which are not in response to any interrogation pulses, but which rather are originated at the ground station.

In order to make unique identification of its own reply pulses possible in the presence of replies to other aircraft and squitter, the transmitted pulse train of each aircraft is jittered in a random fashion so that each pulse occurs slightly ahead or behind the time that it would occur if the pulse train were periodic. The replies to an aircraft's own interrogation pulses may then be identified by finding those replies which are received at the same fixed time interval measured from the jittered interrogation pulses.

It is thus in general a goal of all DME systems to be able to uniquely identify the replies associated with the transmitting aircraft, to derive and display a distance measurement corresponding to the detected replies, and to accomplish this as rapidly and with as few errors as possible. The majority of DME's in use today use an analog system to determine range and groundspeed and in general operate by scanning a time slot or range gate over the possible time for replies. According to this type of system a scanning position is tested by the time slot for the presence of replies and if no replies are received the time slot is advanced to a new scanning position for a similar testing and so on. One disadvantage of this system is that scanning of the entire field may take as long as 10 seconds and this type of system is therefore usually characterized by long acquisition time of both range and groundspeed data. Further, such systems are generally characterized by ineffectiveness in high noise environments, relative impreciseness in the determination of range, and an inability to lock on to a DME station with low reply rates.

Applicants are further aware of a DME system which operates on digital instead of analog principles in which all replies received during a cycle are digitally stored, and compared with replies received over the next cycle to determine the presence of coincidences. While such a system possesses certain advantages over the analog system, particularly the faster acquisition of range data because of the elimination of the scanning slot, the particular digital system known to applicants is believed to be more than desirably susceptible to error, to have a relatively low signal to noise ratio and to be less effective than desirable in high noise environments and in locking on to a DME station with low reply rates. Additionally, the system is not capable of accurately determining range in the presence of echo signals which is a requirement for a DME system to attain Technical Standard Order status, which is a categorization defined by the Federal Aviation Agency.

It is therefore an object of the present invention to provide a DME apparatus and method which has an extremely low probability of providing an erroneous or false range output indication.

It is a further object of the invention to provide a DME apparatus and method which provides a relatively fast acquisition time of range and groundspeed data and which determines range with a relatively high degree of preciseness.

It is a further object of the invention to provide a DME apparatus and method which is effective in high noise environments.

It is still a further object of the invention to provide a DME apparatus and method having an ability to lock on to a DME station having low reply rates.

It is still a further object of the invention to provide a DME apparatus and method having a relatively high signal to noise ratio.

It is a further object of the invention to provide a DME system and method whose operation is not inhibited by the presence of echo signals.

It is a further object of the invention to provide a DME having a groundspeed detecting means with an initialization capability.

The above objects are accomplished by providing a DME system having a means for storing information indicative of the times of receipt of all replies and a means for determining whether one or more replies are received at a common time for a predetermined minimum number of successive cycles. If this criterion is met then a distance measurement signal is derived from the first occurring of the common times of receipt and is displayed, the acquisition time for this data being less than one second. The later occurring common time or times of receipt may have been caused by echoes of the transmitted pulse and are not displayed. Additionally, when the criterion is met a range gate having a duration which is only a small percentage of a cycle is generated and incoming replies over a number of cycles are tested to determine if replies in a predetermined minimum percentage of cycles fall within the range gate. If this second criterion is met then the system switches into the track state in which all incoming replies are combined with the range gate in a coincidence detector before further processing. This range gate thus excludes replies to other aircraft and squitter which would otherwise get through, and hence the signal to noise ratio of the system is improved in track. The improvement in signal to noise ratio permits reducing the predetermined number of successive common times of receipt necessary for the distance measurement and range gate signals to be generated. In the illustrative embodiment of the invention the predetermined number of successive common times of receipt is two successive common times in the search mode and that is reduced to one common time in the track mode. Reducing the predetermined number in turn permits faster acquisition of range data and allows the receiver to respond to DME stations having lower reply rates. It is further to be understood that the system and method of the invention may find application in radar ranging systems other than DME.

Further, the invention provides a groundspeed detecting means which measures the rate of change of position of the range gate and provides a groundspeed signal indicative thereof. Since the range gate is filtered the rate of change of position signal is relatively smooth. The groundspeed detecting means further includes an initialization means which increases the speed of acquisition of accurate groundspeed data, and provides a groundspeed readout when the system is in search.

The invention will be better understood by referring to the drawings which illustrate an illustrative embodiment of the invention and in which:

FIG. 1 is a diagram which shows several transmitted pulses, several reply pulses and a relationship to the transmitted pulses, and the range gate which is generated by the system of the invention.

FIG. 2 is a simplified functional diagram which illustrates the operation of the invention.

FIG. 8 shows the ramps whih are generated by the linear ramp generator.

Figure 3:
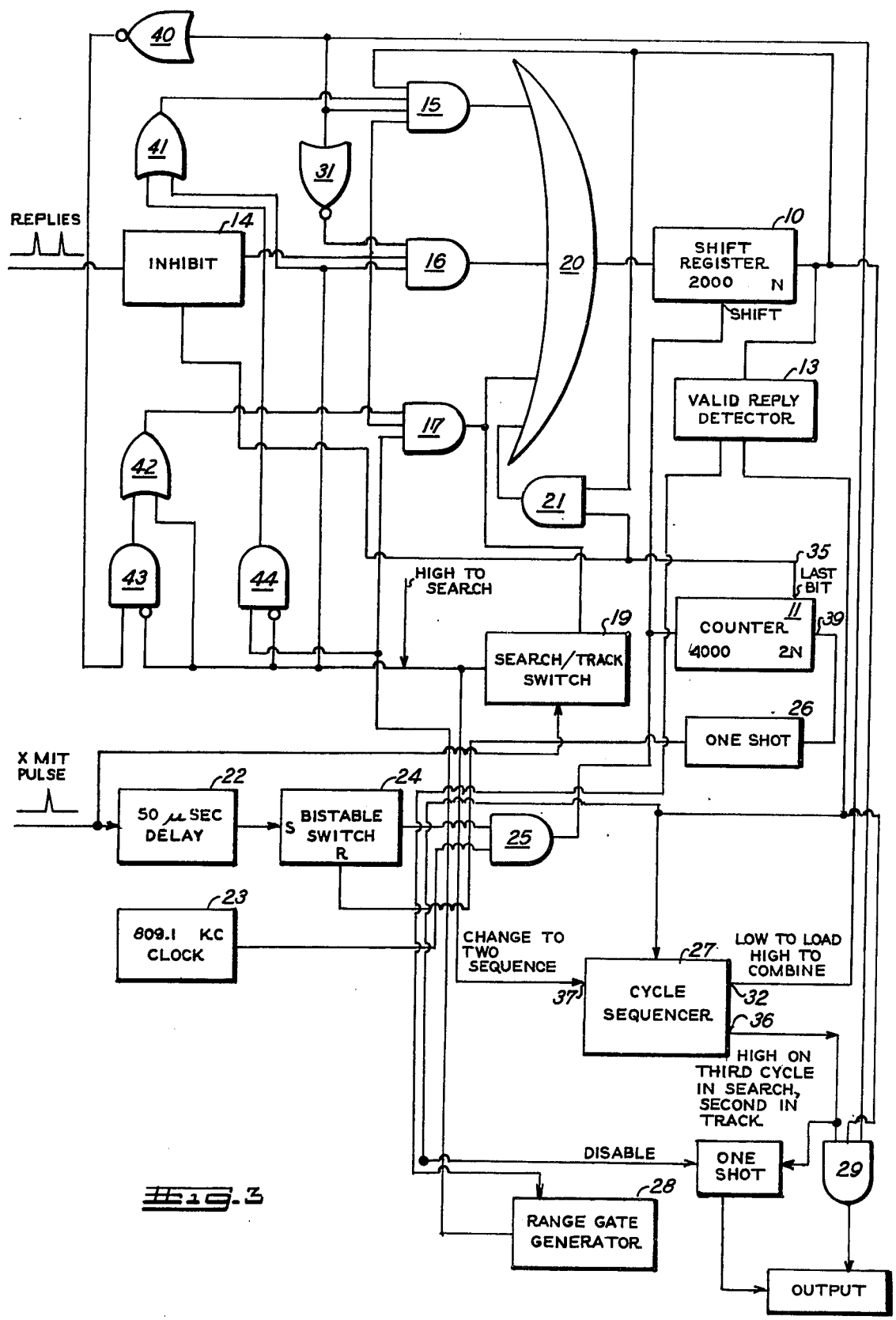
FIG. 3 is a block diagram of the system which is shown in functional form in FIG. 2.

Referring to FIG. 1 pulses A, B, C, D and E represent the transmitted or interrogation pulses which are transmitted to the DME station by the transmitter. As indicated above, the transmitted pulse train is randomly jittered about a nominal transmission frequency and a typical nominal period between adjacent transmitted pulses is 1/30 second. The jittering is accomplished by modulator means known to those skilled in the art, such as a random noise generator. Thus in FIG. 1, line 1, the transmitted pulse train has a nominal period T but because of the jittering the actual time interval between the transmission of pulses A and B is $T + \Delta t_1$ and the time interval between the transmission of pulse B and pulse C is $T + \Delta t_2$.

Referring to the first cycle illustrated in line 1 of FIG. 1, it is seen that three replay pulses, $a$, $b$ and $c$ are received. During the second cycle, one reply pulse d is received, during the third cycle two reply pulses, $e$ and $f$ are received and so on for the remaining cycles shown. In an actual DME system anywhere from zero to four reply pulses are received and processed during a cycle. As stated above, the object of the DME is to find those reply pulses which are replies to the transmitting aircraft and to develop a distance signal proportional to the time of occurrence of those pulses. According to the invention, this is accomplished by finding those reply pulses which occur at the same time with respect to the transmitted pulse for at least a fixed predetermined number of cycles. After the fixed system delay $d$, shown in FIG. 1 is subtracted, the time between each transmitted pulse and the appropriately identified reply pulse responsive thereto is proportional to distance according to the relationship $12.36 \mu s = 1$ mile.

As will be explained in greater detail with respect to the subsequent Figures, the time over which the replies are received is divided by a digital clock pulse train into intervals corresponding to a predetermined distance increment which is 0.1 mile in the illustrative embodiment, and the clock frequency in the illustrative embodiment is therefor $1/1.236 = 809.1$ kc. Thus the distance corresponding to each reply is ascertained to the nearest 0.1 mile.

Although not pertinent to the contribution of the present invention it should be understood that in an actual DME system each transmitted pulse shown in FIG. 1 is actually a pulse pair having a predetermined spacing between the pulses of the pair. Likewise the reply pulses emitted at the DME station are a pulse pair having a predetermined spacing between the pulses of the pair, and to detect only DME reply pulses in the presence of other signals in the atmosphere which may have various origins but which are known collectively in the art as "fruit", the decoder of the receiver allows only pulse pairs having the predetermined spacing through for further processing. Hence the received signals shown in FIG. 1 as single reply pulses have all been allowed through the "pair detector" of the decoder and are therefore signals which have been originated at the ground station. In the remainder of the present specification and in the claims, no further reference is made to transmitted or reply pulse pairs but it is to be understood the terms "transmitted pulse", "reply pulse", "replies", "received signals", and their synonyms are to be constructed as meaning pairs of pulses and signals as well as individual pulses and signals. Further, although not specifically stated it is to be understood that the terms "time of occurrence", "times of occurrence", "time of receipt" and "times of receipt" of the "reply pulses" or "received signals" are to be construed as meaning the times of occurrence or receipt with respect to the preceding interrogation or transmitted pulse.

FIG. 2 is a simplified functional diagram which broadly illustrates the operation of the invention in both the search and track modes. In the search mode after appropriate decoding and shaping, the reply pulses are inputted to digital correlation detector 1, the structure of which is shown in greater detail in the subsequent Figures. Thus referring to FIG. 1, during the first cycle pulses $a$, $b$ and $c$, would be loaded into and stored in the correlation detector. During the second cycle pulse $d$ is loaded and the correlation detector determines whether the time of occurrence of pulse 2 is coincident with the time of occurrence of any of pulses $a$, $b$ or $c$. If such a coincidence is found to exist then the time of occurrence of the coincident replies is stored and the replies occurring during the third cycle are loaded into the detector to determine if any of them are coincident with the stored time of occurrence. If a coincidence is again detected, then a true reply is deemed to have occurred as indicated by functional block 4 in FIG. 2. Such a true reply is illustrated in FIG. 1 as occurring at time $t_3$. If a coincidence is not detected in either the second or third cycles, then there is no true reply signal output at block 4 and the system begins with a first cycle again.

If a true reply is detected, then a signal is inputted to range gate generator 7 which generates a gate which is centered over the time of occurrence of the two successive coincidences and which has a duration which is a small fraction of a cycle but wide enough to encompass replies at several adjacent time slots. In the illustrative embodiment of the invention, for a maximum range capability of 200 miles each cycle is divided into intervals of 1.236 $\mu s$, and the range gate utilized is 18 $\mu s$ in width. Thus the range gate should in general be narrow enough so that it will not pass most of the replies to other aircraft, squitter and echo signals which occur during a cycle but the specific duration thereof may be experimented with and modified while still falling within the scope of the present invention. A range gate is shown illustratively, but not to the scale of the illustrative embodiment at F and G on line 2 of FIG. 1 during the fourth and fifth cycles. As will be discussed below, because of possible circuit limitations it is possible that the range gate may not be properly generated as early as the fourth cycle but may begin during a later cycle.

The range gate is inputted to digital correlation detector 1 and as will be explained more clearly below is combined with the incoming reply pulses in a coincidence detector. The output of the coincidence detector is inputted to search/track switch 6 which determines whether or not at least a predetermined percentage of the incoming replies fall within the range gate. If this is the case, then search/track switch 6 switches the system into the track mode wherein all of the incoming replies must be ANDed with the range gate before further processing to determine coincidence with replies from other cycles. Thus many of the replies to other aircraft and squitter which would be inputted for storage and coincidence determination in search do not get through in track because they fall outside the range gate. This means that the signal to noise ratio is increased and this allows the correlation detector to operate on a 2-cycle instead of a 3-cycle sequence in track. Thus in track, as indicated by functional block 2 in FIG. 2, a load cycle followed by a coincidence in the following cycle is sufficient for a true reply to be detected. Use of 2-cycle instead of a 3-cycle sequence permits faster acquisition of data and allows the system to respond to DME stations having low reply rates as the number of times that two coincidences in a row will be received is substantially higher than the number of times that three coincidences in a row will be received.

It is significant to note that while a preferred embodiment of the invention operates with a 3-cycle sequence in search the invention only requires that common times of receipt of reply signals be present for a predetermined number of successive cycles and the predetermined number may be any number greater than one. Additionally while in the illustrated embodiment the system switches to a 2-cycle sequence in track the invention only requires that the predetermined number uitlized in search be reduced when the system switches into track.

All true replies are inputted to distance indicator 3 which converts their time of occurrence to a distance figure and displays this figure as well as being inputted to the range gate generator to update the position of the range gate. Additionally, the rate at which the position of the range gate changes is tracked by groundspeed detector 8 which includes initializer 10 and which detector inputs a signal to groundspeed indicator 9 which indicates the groundspeed of the aircraft.

FIG. 3 is a block diagram of the system shown in functional form FIG. 2 and more clearly illustrates the fundamentals of the digital correlation detector. The operation of timing network 30 of FIG. 2, which is comprised of blocks 22 to 26 and 11 in FIG. 3, will be described first. The timing network is operative to delineate a time following each transmitted pulse over which replies are admitted to the correlation detector (which time corresponds to the maximum distance to be measured) and to divide this time up into the number of unit time intervals discussed above.

The delay $d$ shown in FIG. 1 is caused mainly by the delay between the receipt of a transmitted pulse and the transmission of a reply pulse at the ground station and to a lesser extent by receiver processing delays. This delay is about 50 $\mu$secs. and is provided in the system of FIG. 3 by delay network 22. The occurrence of the transmitted pulse triggers 50 $\mu$secs. delay network 22 which feeds the delayed signal to the set input of set/reset bistable switch 24. This causes the output of the switch to go high and the output is connected to the input of AND gate 25 as is the output of clock 23. As indicated above, since in the illustrative embodiment it is desired to divide the cycle into time intervals corresponding to 0.1 mile the clock frequency is 809.1 kc.

The setting of switch 24 thus causes the clock signal to be gated through AND gate 25 to the input of counter 11 which counts a predetermined number of clock pulses before outputting a signal on output line 39 and resetting itself to zero. The counter output signal is fed to a one-shot multivibrator 26 which immediately generates a pulse which is fed to the reset input of bistable switch 24, thus resetting the switch and causing its output to go low. Thus, one input to AND gate 25 goes low and further clock pulses are inhibited from passing therethrough, thus signifying the end of the timing interval.

The clock pulses outputted from AND gate 25 during the timing interval are fed to the shift input of shift register 10. The detected reply pulses are inputted to the information input of the shift register and, as will be explained in greater detail below, the clock pulses shift the replay signals through the register. If each clock pulse is indicative of 0.1 mile and it is desired that the total range of the DME be 200 miles, then the shift register 10 will have 2000 storage positions.

The detected reply pulses during a first or load cycle are inputted to the system at INHIBIT gate 14 which for the present we will assume is a closed circuit and thus in its non-inhibiting state. All replies coming into the system may be loaded into shift register 10 through OR gate 20 and one of AND gates 15, 16 and 17. In the load cycle in search replies are fed through AND gate 16, in the recombination cycles in both search and track through AND gate 15 and in the load cycle in track through AND gate 17. As will be described in detail below, the outputs of cycle sequencer 27 and search/track switch 19 determine the flow path of the replies.

Figure 5:
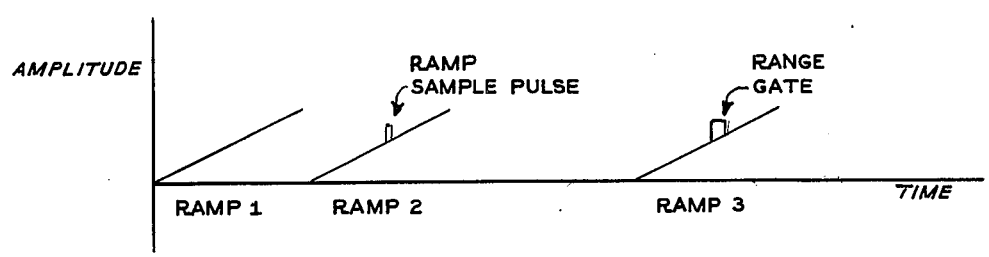
FIG. 5 is a detail diagram of the cycle sequencer and valid reply detector.
Figure 5:
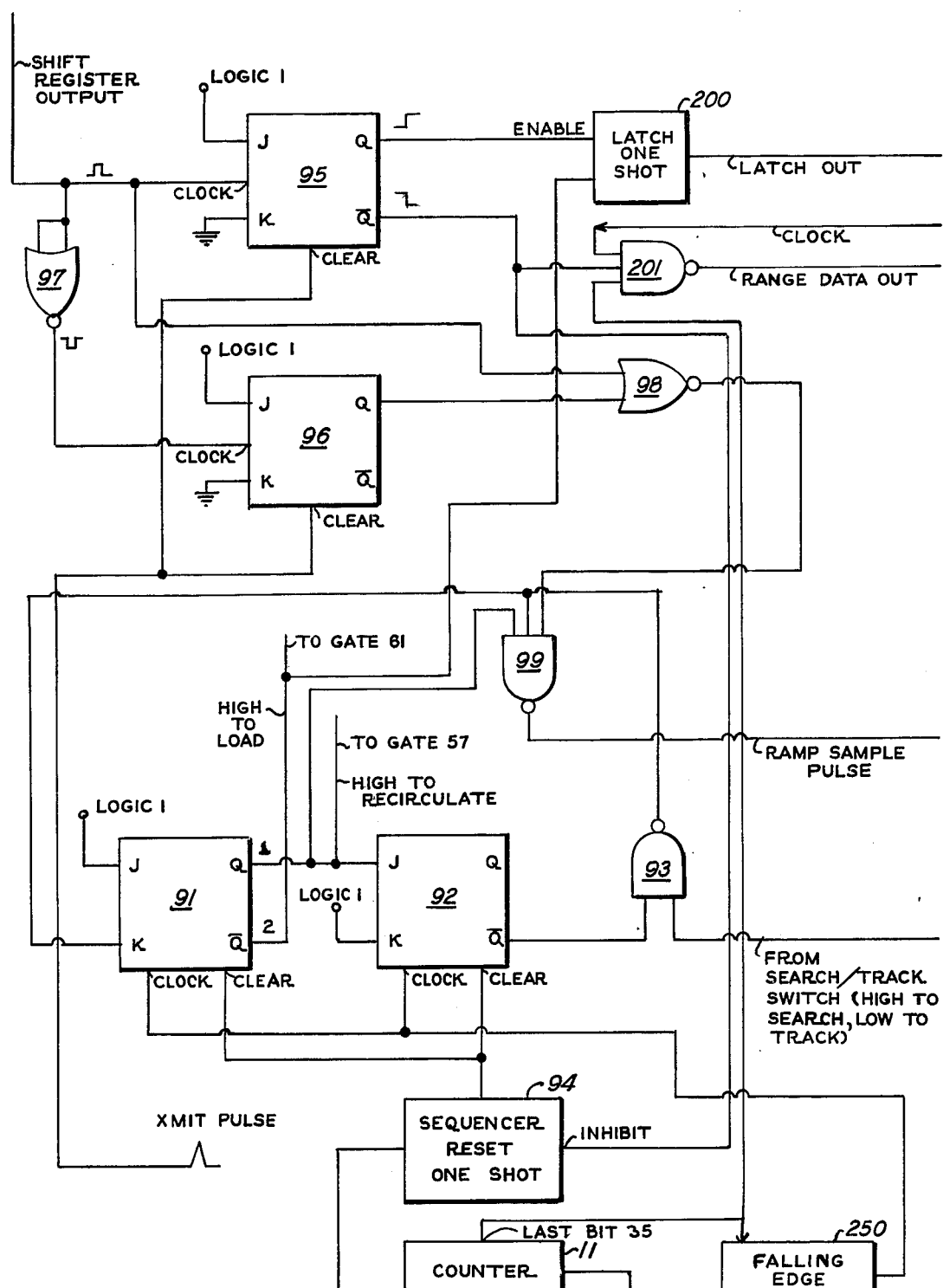

Cycle sequencer 27, one embodiment of which is shown in greater detail in FIG. 5, is a circuit which knows whether the digital correlation detector is in the first (load), second or third cycles and provides information indicative of this at its outputs. In FIG. 3 output 32 of the sequencer is low during the load cycle which low signal is inverted by inverter 31 and inputted as a high signal to AND gate 16. Also inputted to AND gate 16 is the output of search/track switch 19 which is high in the search state. Thus in the load cycle the reply signals are gated through AND gate 16 and from there through OR gate 20 to the information input of shift register 10. The signals are shifted through shift register 10 by the clock pulses from AND gate 25 and thus at the end of N clock pulses, shift register 10 is fully loaded. If any reply signals occurred during the time interval, then they are present in shift register 10 at a storage position displaced from the right end of the regirter in FIG. 3 by a number of storage positions which is proportional to the DME distance corresponding to the replies.

Each cycle is divided in half by counter 11. If counter 11 is a binary counter and has enough bits to count to 2N, at the time that the last bit first becomes operative the counter will have counted to N. Thus in FIG. 3 counter 11 is arranged so that line 35 goes high when it has counted to N and remains high until the counter counts to 2N at which time line 39 goes high. Since shift register 10 has N storage positions, beginning at count N + 1 and ending with count 2N the data in the register is shifted out and examined by valid reply detector 13, and at the same time recirculated so that the data is not lost. Thus when line 35 goes high data is recirculation through AND gate 21 and OR gate 20, INHIBIT gate 14 becoming activated at this time to inhibit a new data from being inputted to the system. The data clocked out of the shift register is examined by valid reply detector 13 to determine if at least one signal is present. If it is, then valid reply detector 13 causes output 32 of sequencer 27 to go high in the second and third cycles in search and in the second cycle in track. If no signal is present then output 32 remains low and a load cycle is repeated.

Assuming that at least one reply was present during the first cycle replies occurring during the first half of the second cycle are loaded into the register through AND gate 15 if they are coincident with replies which occurred during the first cycle. Thus during the second cycle as replies are fed to gate 15, the contents of shift register 10 are also fed to gate 15. Since output 32 of the sequencer and the output of search/track switch 19 are high, each time a coincidence between replies in the first and second cycles occurs a pulse is inputted to the register. If there are no coincidences the register is empty at the end of the second cycle and the next cycle is a load cycle. If there is at least one coincidence then a third cycle similar to the second cycle ensures and if there is a coincidence during the third cycle its time of occurrence is fed through gate 29 to the output where it is displayed as DME distance.

Simultaneously the signal indicative of the time of occurrence of the second successive coincidence is fed to range gate 28 which generates the range gate discussed above which is centered over the coincidence time. Generator 28 is arranged so that the gate occurs in successive cycles and it is inputted to AND gate 17 along with the incoming reply signals. Thus the incoming reply signals are gated through AND gate 17 only if they are coincident with the range gate. Such coincidences are fed to search/track switch 19 along with the transmitted pulses and the function of search/track switch 19 is to determine if a predetermined percentage of replies fall within the range gate and in the illustrative embodiment this percentage is 50%. If the percentage condition is met, then search/track switch 29 switches into the track state and the output thereof goes low. This inhibits reply pulses from being passed through AND gate 16 and forces all replies through AND gates 17 or 15 where they are ANDed with the range gate. Also, the output of search/track switch 19 is fed to input 37 of cycle sequencer 27 which is effective to change the sequencer to a 2-cycle instead of a 3-cycle sequence.

The search/track switch and cycle sequencer are connected to AND gates 15 and 17, in part through inverter 40, AND gates 43 and 44 and OR gates 41 and 42 so that during the first or load cycle in track incoming replies are ANDed with the range gate in AND gate 17 and during the second or coincidence cycle in track are ANDed with the range gate in AND gate 15. If a coincidene is detected, then the distance information is outputted and displayed through AND gate 29 and the range gate is up-dated.

Figure 4:
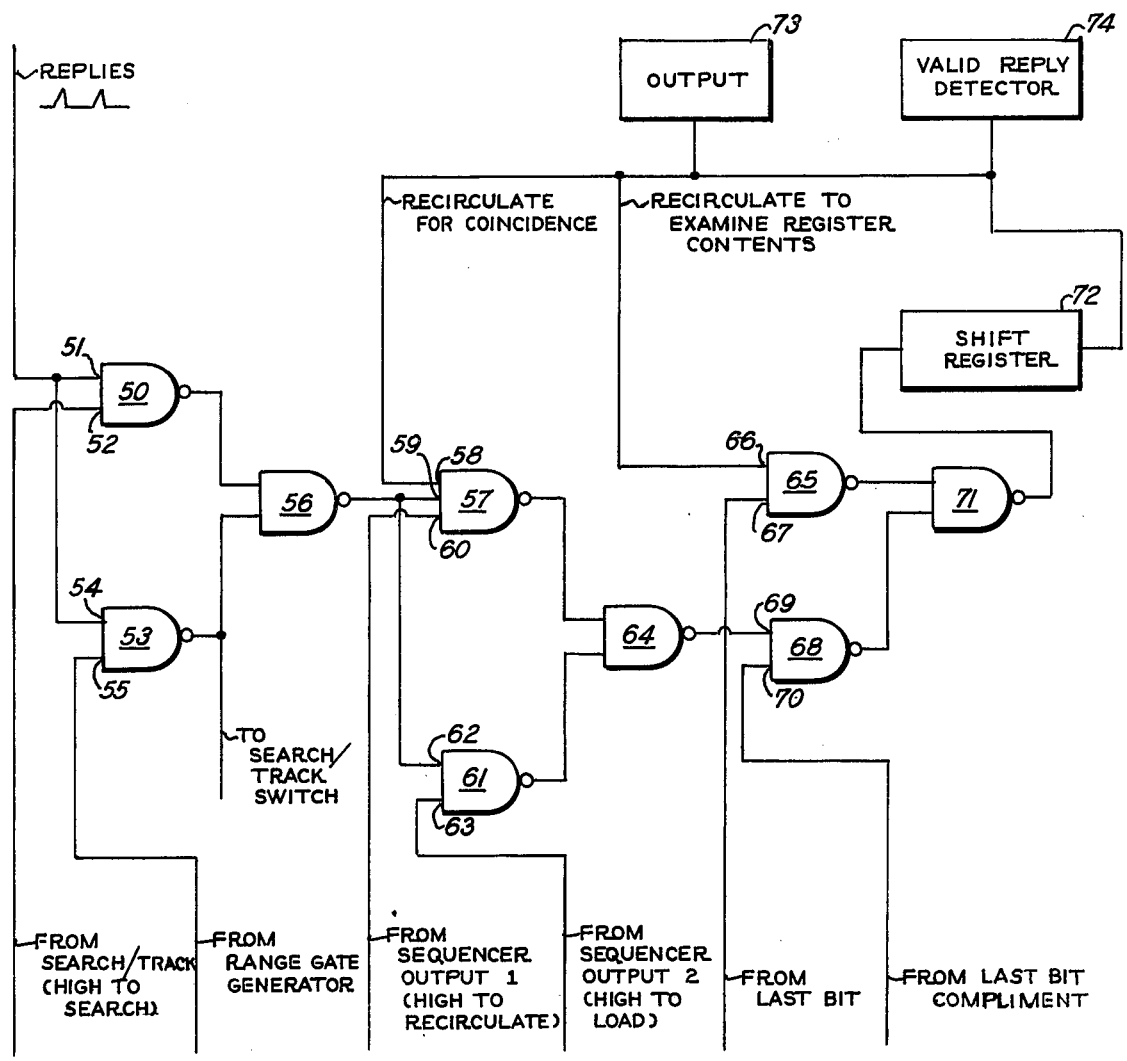
FIG. 4 is a schematic diagram of a preferred embodiment of the gate network input to the shift register.

FIG. 4 is a schematic diagram of a preferred embodiment of the gate network input to the shift register and its operation is substantially functionally equivalent to the operation of the gate network shown in FIG. 3. The gate network of FIG. 4 is comprised of a series of interconnected NAND gates and the reply pulses are fed to input 51 of NAND gate 50. In the load cycle of the search mode, input 52 to gate 50, which is connected to the search/track switch output, is high and the path that the replies follow while being loaded into the register is through NAND gates 50, 56, 61, 64, 68 and 71. The signals are fed through gate 61 instead of gate 57 because inputs 63 and 60 of those gates respectively are connected to the output of the cycle sequencer, which arranges for input 63 to be high during the load cycle and input 60 to be low. Specifically the inputs are illustrated as coming from the cycle sequencer embodiment shown in FIG. 5.

The load cycle replies are fed through gate 68 instead of gate 65 because input 70 of gate 68 is high for the first half of each cycle while input 67 of gate 65 is low and vice-versa for the second half of each cycle. During the second half of each cycle, the contents of the shift register are recirculated through NAND gate 65 and are examined in the valid reply detector 74.

During the second and third cycles in search and the second cycle in track input 63 to NAND gate 61 is low while input 60 to NAND gate 57 is high and the contents of the shift register are ANDed in gate 57 with the incoming replies which are fed in on input 59, to determine if any coincidences are present.

When the search/track switch switches into track, input 52 of gate 50 goes low and all of the incoming replies are forced through NAND gate 53 where they are ANDed with the range gate. Hence in the track mode all incoming replies are ANDed with the range gate.

FIG. 5 is a diagram of cycle sequencer 27 and valid reply detector 13 of FIG. 3. As described in conjunction with FIG. 4, it is the function of the cycle sequencer to provide a high signal to gate 61 and a low signal to gate 57 in the load cycle and a high input to gate 57 and a low input to gate 61 during the recirculate for coincidence cycles. To accomplish this the contents of the shift register must be examined during the second half of the preceding cycle to determine if any signals are present in the register. If none are present then the next cycle is again a load cycle while if one or more signals is present, the next cycle is a recirculate for coincidence cycle. Additionally, the cycle sequencer must know whether the system is in search or in track to provide either a three cycle or two cycle output sequence.

Referring to FIG. 5, the cycle sequencer is comprised of bistable devices 91 and 92 and NAND gates 93, which are operated in conjunction with requencer reset one-shot multivibrator 94.

The valid reply detector is comprised of bistable devices 95 and 96.

Bistable devices 91 and 92 are arranged so that output 1 of bistable device 91 which is connected to an input of gate 57 is high to recirculate while output 2 which is connected to an input of gate 61 is high to load. The J input of bistable device 91 is connected to a logic 1 source as is the K input of bistable device 92. The $\overline{Q}$ output of device 92 is connected to an input of NAND gate 93 as is the output of the search/track switch. Since the output of the search/track switch is high to search and low to track, the output of NAND gate 93 will be either high or low in search depending on the $\overline{Q}$ output of device 92 but will always be high in track.

If the valid reply detector determines that no signals are in the register, sequencer reset one-shot multivibrator which is activated at the end of each cycle by the end of count output signal of counter 11 clears devices 91 and 92 and with the next clock pulse a new load cycle begins. If the valid reply detector determines that a signal is in the register, it feeds a signal to the inhibit input of the sequencer one-shot multivibrator so that the counter output is unable to trigger it, and the bistable devices are not cleared. Sequencer reset one-shot multivibrator 94 is a logic block known to those skilled in the art and may for instance be one half of a Fairchild 8602.

As indicated above, the last count of counter 11 is fed to reset one-shot 94 to clear bistables 91 and 92 if no shift register signals are detected by the valid reply detector. Bistables 91 and 92 are clocked by the output of falling edge detector 250 which detects the falling edge of the last bit of the counter. The clocking of the bistables and incrementing of the sequencer is thus the last operation performed in a cycle. Thus the output of falling edge detector 250 is arranged to occur (by employing a delay means if necessary) before the output of reset one-shot multivibrator 94. Successive cycles cause bistable devices 91 and 92 to assume the states given in the below tables:

| Search Sequence | | Track Sequence | |
|---|---|---|---|
| start load | 1 0 0 0 | load | 1 0 0 0 |
|  | 0 1 1 1 |  | 1 1 1 1  start only |
| after 1st clock pulse | 1 1 1 0 | sample | 1 1 1 0 |
|  | 0 0 1 1  repeat |  | 1 0 1 1 |
| after 2nd clock pulse | 1 1 1 1 | load | 1 0 0 1 |
|  | 1 0 1 0 |  | 1 1 1 0  repeat |
| after 3rd clock pulse load | 1 0 0 0 | sample | 1 1 1 0 |
|  | 0 1 1 1 |  | 1 0 1 1 |
|  |  | load | 1 0 0 1 |
|  |  |  | 1 1 1 0 |

The operation of the valid reply detector is as follows. During the recirculate to examine portion of each cycle the contents of the shift register are outputted to the clock input of device 95 and the signals illustrated at the Q and $\overline{Q}$ outputs of the device are generated in response to the presence of a shift register signal. Further, the shift register signals are inverted in inverter 97 and applied to the clock input of bistable device 96. The Q output of device 96 is connected to an input of NOR gate 98 and the shift register output is connected to the other input of the gate. The output of NOR gate 98 is a pulse occurring in time correspondence with the shift register signal and becomes the ramp sample pulse if it occurs during the third cycle in search or the second cycle in track. The pulse is fed to NAND gate 99 which also received inputs from output 1 of bistable device 91 and the output of NAND gate 93. Since these outputs are both high only in the final cycle of a sequence the pulse output of gate 98 is gated through gate 99 only in the final cycle of a sequence.

NAND gate 201 has two of its inputs connected to the last bit line 35 of counter 11 and to the clock pulse line. Hence during the second half of each cycle clock pulses are outputted from the output of gate 201 which is denoted Range Data Out. The third input of gate 201 is connected to the $\overline{Q}$ output of device 95 which has a negative going step signal thereon at the time of occurrence of a shift register signal. Hence when a shift register signal is read out of the register further clock pulses are inhibited and at the time of occurrence of the shift register signal a number of output pulses proportional to the DME distance thereof have appeared at the Range Data Out output.

Latch one-shot multivibrator 200 has its enable input connected to the Q output of device 95 and its other input connected to output 2 of device 91. Therefore one-shot multivibrator 200 is enabled only at the time that a reply is read out of the register and produces a Latch Out output signal when the sequencer switches from recirculate to load at the end of the cycle, providing that a reply occurring during that cycle has enabled the one-shot. Thus the only time that a Latch Out output signal can occur is at the end of the third cycle in search or the second cycle in track.

Figure 6:
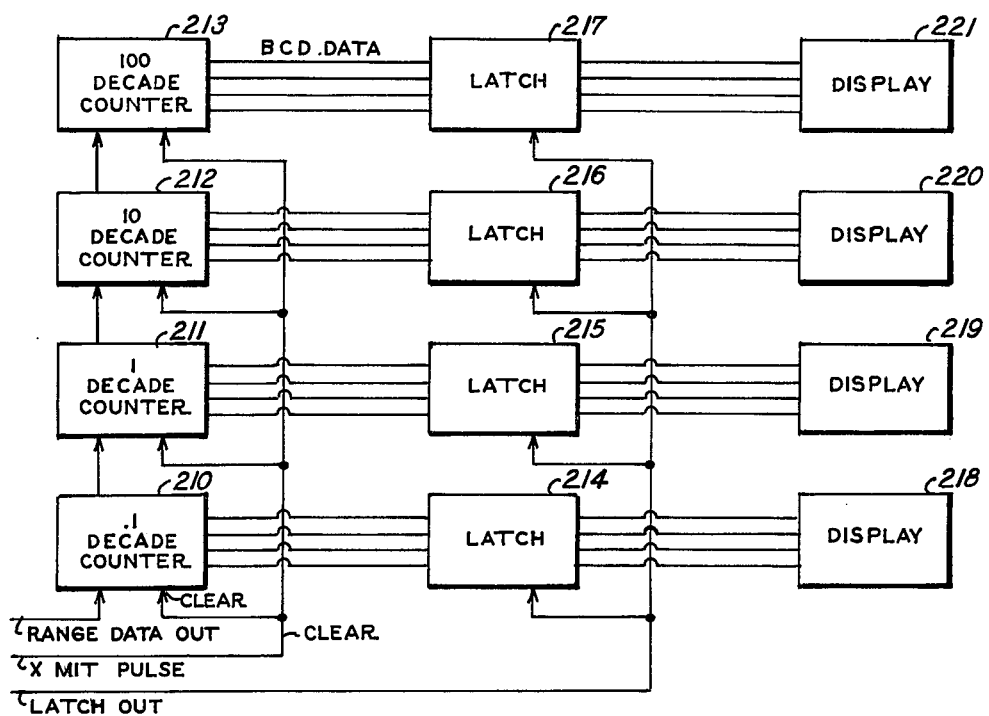
FIG. 6 is a diagram of the output and display network of the DME of the invention.

FIG. 6 is a block diagram of the output and display network of the invention for displaying the detected DME distance. It is comprised of decate counters 210, 211, 212 and 213, latches 214, 215, 216 and 217 and displays 218, 219, 220 and 221. The range data out line shown in FIG. 5 is connected to the input of the decade counter network. As described above, clock pulses are fed out on the range data out line until a stored signal is outputted from the shift register, at which time the count stops. Hence at the time of occurrence of the shift register signal decade counters 210, 211, 212 and 213 will have counted to a number corresponding to the position of the signal in the shift register. Since the count stops at the first shift register signal only the first stored signal is outputted and displayed. Thus, if there are multiple signals stored in the shift register, for instance due to echo signals, the later occurring signals are not fed through to the counters.

The range data out signals are fed out during the second half of each cycle and thus the decade counters are counted up during each cycle. However, as indicated above, it is desired to utilize only those shift register signals which are present during the final cycle of a sequence, that is according to the illustrative embodiment, the third cycle in search or the second cycle in track, and for this reason the latch one-shot multivibrator 200 in FIG. 5 is provided. The latch out line is fed to the inputs of latches 214, 215, 216 and 217 in FIG. 6. As described in conjunction with FIG. 5 a signal is generated on this line only when a shift register signal is fed out of the register and the cycle is a final cycle of the sequence. Hence at such a time latches 214, 215, 216 and 217 are triggered, which causes them to latch signals indicative of the numbers in the counters through to displays 218, 219, 220 and 211. Thus a distance figure corresponding to the first occurring coincidence in the shift register is displayed. Counters 210, 211, 212 and 213 are cleared at the beginning of each cycle by the transmitted pulse or by a one-shot multivibrator output pulse triggered by the transmitted pulse.

Figure 7:
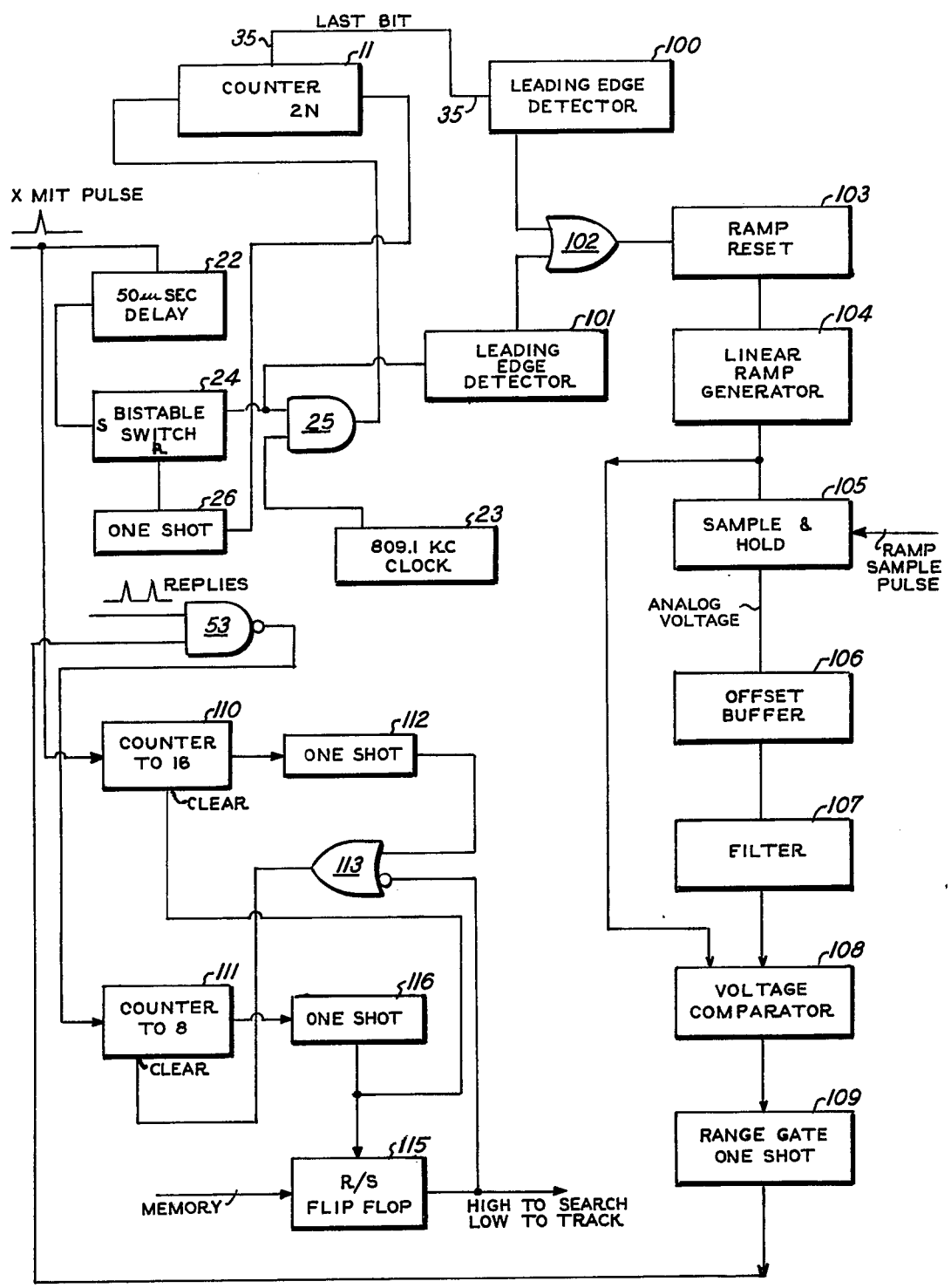
FIG. 7 is a block diagram of the range gate generator and search/track switch.

FIG. 7 is a block diagram of range gate generator 28 and search/track switch 19 shown in FIG. 3. Referring to FIG. 5, the ramp sample pulse is generated during the recirculate to examine half of the third cycle in search at a time measured from the beginning of the second half of the third cycle which is proportional to range of the coincidence. The function of the range gate generator is to generate a range gate at the same time with respect to the beginning of the first half of the next cycle or other subsequent cycle as the time of occurrence of the ramp sample pulse with respect to the beginning of the second half of its cycle.

Since the operation of the range gate generator is dependent upon the timing circuitry of the system, blocks 22, 23, 24, 25, 26, and 11 are repeated in FIG. 7. Additionally, linear ramp generator 104 is provided and it may be any type of conventional ramp generator circuit known to those skilled in the art. It is arranged so that it generates a linear ramp each time it is reset by a signal from ramp reset switch 103. Ramp reset switch 103 is connected through OR gate 103 and leading edge detector 101 to the output of set/reset bistable switch 24 and is also connected through OR gate 102 and leading edge detector 100 to the last bit output 35 of counter 11. Hence ramp reset switch 103 is triggered both at the beginning of each cycle and exactly after half of the cycle has elapsed.

Referring to FIG. 8 it is seen that the output of linear ramp generator 104 during the first cycle is ramp 1 followed by ramp 2, ramp 1 lasting for a total of N counts and ramp 2 also lasting for a total of N counts. During the second ramp which also defines the time interval of the recirculate to examine portion of the cycle, the ramp sample pulse output of NAND gate 99 in FIG. 5 is generated. This ramp sample pulse is fed to the input of sample and hold circuit 105 which may, for instance, be comprised of an analog gate for sampling and a capacitor for holding. Thus the second ramp is sampled at the time of occurrence of the ramp sample pulse and the analog voltage value of the ramp at the time of sampling is fed to offset buffer 106 which, for instance, may be an operational amplifier with an offset.

The output of offset buffer 106 is fed through filter 107 to voltage comparator 108. At the voltage comparator the analog voltage is compared with the first ramp of the next cycle or other subsequent cycle denoted as ramp 3 in FIG. 6 and at the time that ramp 3 rises to the stored voltage, voltage comparator 108 outputs a signal which is effective to trigger range gate one-shot multivibrator 109 which generates the range gate which in the illustrative embodiment of the invention is 18µs wide. If the relative circuit component values including the value of the holding capacitor in sample and hold 105 cannot be arranged so that the capacitor can be charged to the sampled value of the ramp during the occurrence of a single ramp sample pulse then it may be necessary for several ramp sample pulses (several successful sequences) to occur before the capacitor is charged to the sampled value of the ramp. Offset buffer 106 was described above and the purpose of the offset is to lower the sampled voltage slightly so that a lowered voltage is fed to comparator 108 resulting in the generated range gate being centered over the coincidence time rather than beginning at the coincidence time. If the range gate is 18 µs long then an offset corresponding to 9 µs would be used.

As the time of occurrence of the ramp sample pulse changes in subsequent cycles the range gate is up-dated and its position is changed. However the values of the circuit components in the holding circuit in sample and hold network 105 are arranged so that even if no new ramp sample pulses occur over a period of time, for instance, illustratively several seconds, the sampled value is held so that the range gate continues to be generated. Additionally, the sampled analog value is filtered in filter 107 so that the position of the range gate does not respond to rapid changes in the position of the ramp sample pulse and as will be described below the filtered range gate aids in the determination of groundspeed.

The range gate is fed to NAND gate 53 where it is ANDed with the incoming replies and the search/track switch is provided to determine if a minimum predetermined percentage of the replies occur during the range gate. The search/track switch, in FIG. 7 is comprised of counters 110 and 111, one-shot multivibrators 112 and 114, OR gate 113, and reset/set flip-flop 115. Basically the search/track switch operates by simultaneously counting transmitted pulses and reply-range gate coincidences and determining if over a fixed predetermined number of transmitted pulses at least the predetermined percentage of reply-range gate coincidences is present. In the illustrative embodiment the predetermined percentage is 50% and the fixed predetermined number is 16.

Thus in FIG. 7 counter 110 is a counter to 16 and counter 111 is a counter to 8. It is understood that counters 110 and 111 may be identical with only the appropriate number of stages being utilized in counter 111. The transmitted pulses are inputted to counter 110 while the reply-range gate coincidences are inputted to counter 111. Reset/set flip-flop 115 is either high or low depending upon the signal inputted to it from a memory (not shown) which is indicative of the last state the system was in.

In the operation of the circuit, if counter 11 counts to 8 before counter 110 counts to 16, flip-flop 115 is reset through one-shot multivibrator 114 and thus its output goes low to switch the system into track. At the same time, counter 116 is cleared so that both counters 110 and 111 may begin counting pulses again. If, on the other hand, counter 110 reaches a count of 16 before counter 111 reaches a count of 8, counter 111 is cleared through one-shot multivibrator 112 and OR gate 113, and both counters 110 and 111 start counting again. While it has been found to be expedient to make the search/track decision on the basis of 16 transmitted pulses and to use 50% as the predetermined percentage, it is understood that these may be varied according to the goals of a particular system and are not to be construed in a limiting sense. The memory input to switch 115 is arranged to return the switch to search if no latch out outputs are detected within a predetermined period of time.

As described above, when the output of flip-flop 115 goes low, referring to FIG. 4 all replies are forced through NAND gate 53 and are thus all combined with the range gate before further processing. Additionally, referring to FIG. 5 an input to NAND gate 93 goes low thus causing the cycle sequencer to switch to a two-cycle instead of a three-cycle sequence.

Figure 9:
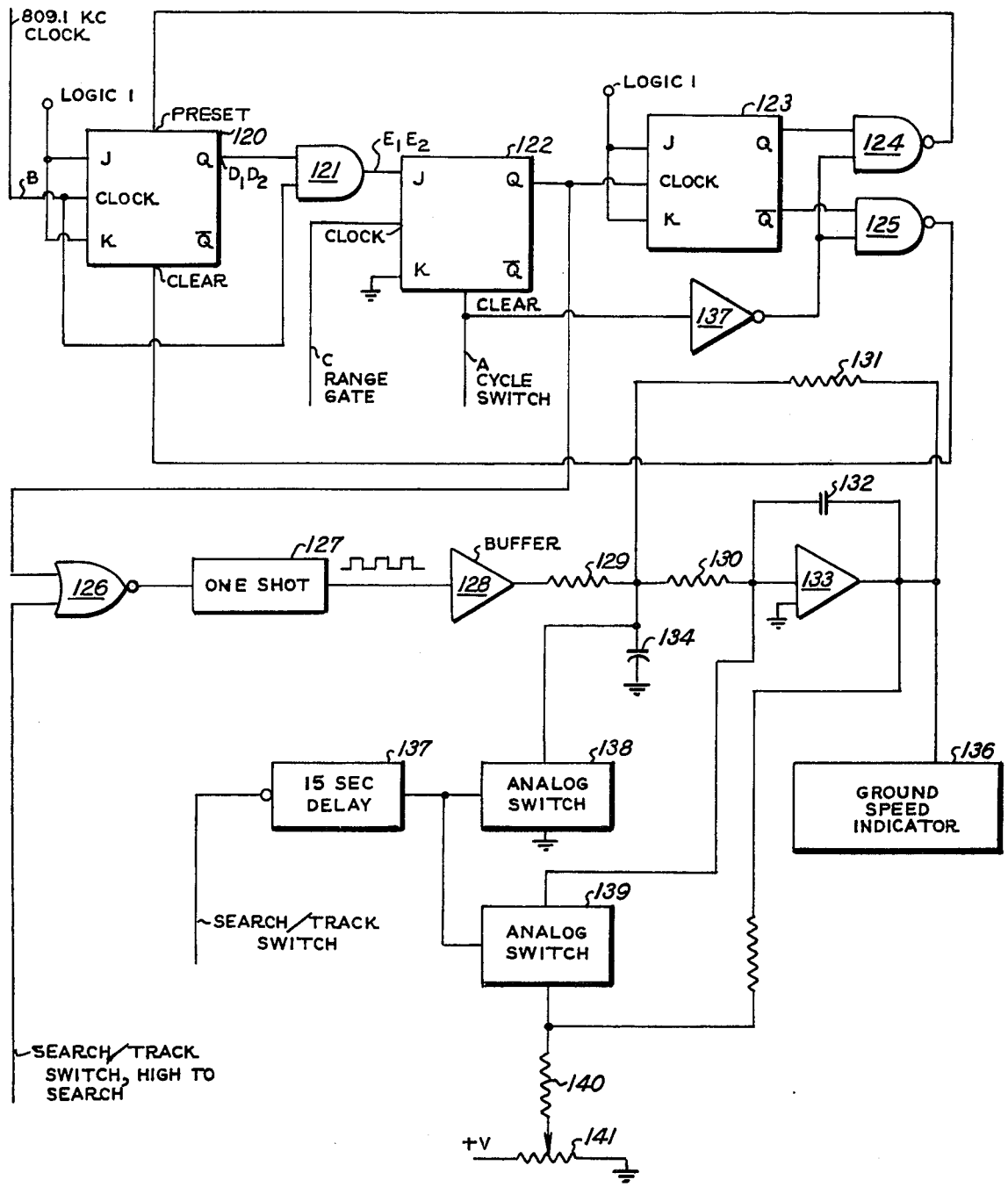
FIG. 9 is a block diagram of the range gate change of position detector and the groundspeed voltage generator.

FIG. 9 is a block diagram of the range gate change of position detector and the ground speed voltage generator which comprise parts of ground speed detector 8 shown in FIG. 2. The range gate change of position detector is comprised of JK multilvibrators 120, 122 and 123, AND gate 121, NAND gates 124 and 125, and inverter 137. Basically, the change of position detector tracks the range gate by comparing the time of occurrence thereof with the 809.1 kilocycle clock pulses, each one of which is indicative of 1/10th of a mile, and outputting a signal indicative of the facts that the range gate has traveled 1/10th of a mile each time the range gate is coincident with a new clock pulse. Additionally, the particular configuration of circuitry utilized prevents jitter in the range gate from providing false tenth of a mile output signals.

Figure 10:
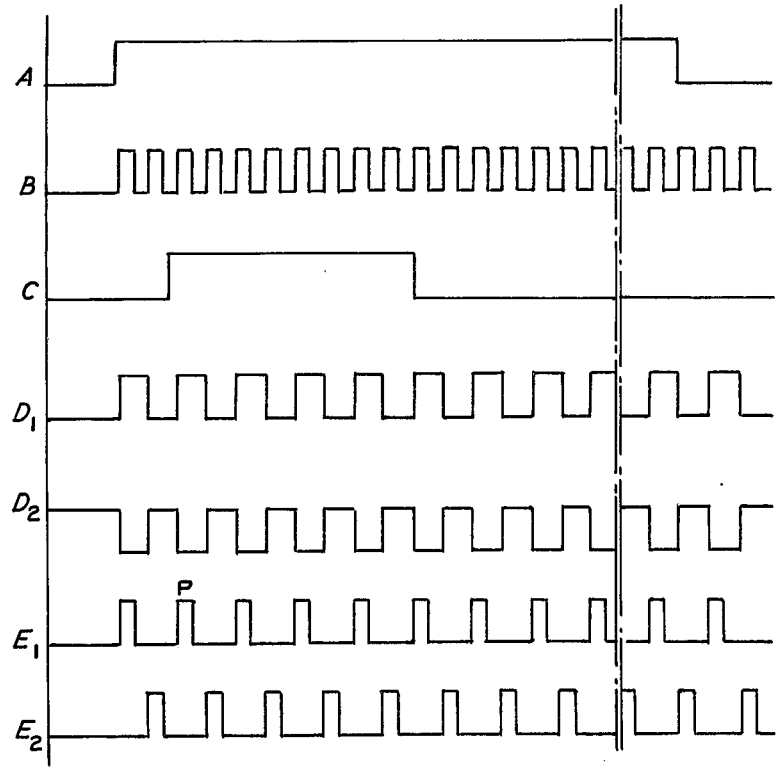
FIG. 10 is a waveform diagram of waveforms occurring at various points in the circuit of FIG. 9.

The operation of the change of position detector of FIG. 9 is described in conjunction with the waveform diagram of FIG. 10. The 809.1 kilocycle clock signal denoted as B in FIGS. 9 and 10 is inputted to the clock input of multivibrator 120. Since the J and K inputs of the multivibrator are tied together, it acts as a divide by two unit, the Q output changing state each time the clock input is pulsed. The Q output of the multivibrator is either the wave form $D_1$ or the waveform $D_2$, which is the inverse of $D_1$, depending on the initial state of the multivibrator determined by the respective polarities of the preset and clear inputs thereof. As long as the Q and $\overline{Q}$ outputs of multivibrator 123 remain in the same state, the same output of multivibrator 120, either $D_1$ or $D_2$, will occur. When multivibrator 123 is clocked, the outputs thereof will change state and the output of multivibrator 120 will change from $D_1$ to $D_2$, or vice versa. This is because the Q and $\overline{Q}$ outputs of multivibrator 123 are connected respectively to one input of NAND gates 124 and 125, the other input of both gates being the inverted cycle switch signal which is the inverse of waveform A of FIG. 8. The outputs of gates 124 and 125 are connected respectively to the preset and clear inputs of multivibrator 120, thus controlling the state that the multivibrator will assume on the next clock pulse.

The Q output, $D_1$ or $D_2$ of multivibrator 120 is ANDed in gate 121 with the clock pulse signal, thus producing signals having a waveform of either $E_1$ or $E_2$, depending upon whether $D_1$ or $D_2$ was inputted to the AND gate. As will be seen by referring to FIG. 10, the waveform $E_1$ is a waveform comprised of the first, third, fifth, seventh, etc. of the clock pulses of waveform B, and waveform $E_2$ is comprised of the second, fourth, sixth, eigth, etc. clock pulse of waveform B.

Multivibrator 122 can only toggle when the J input is high during the leading edge of the range gate, which is inputted to the clock input of the multivibrator. The range gate is denoted as waveform C in FIG. 10. Assuming that the waveform $E_1$ is present at the output of gate 121 and the range gate occurs as shown in FIG. 10, it is seen that multivibrator 122 will not toggle because the J input is not high at the time of occurrence of the leading edge of the range gate. As, however, the range gate moves out in succeeding cycles, the leading edge thereof will eventually occur when pulse P, shown in FIG. 10, is high. Thus the Q output of multivibrator 122 will change state indicating that 1/10th of a mile has been traversed and since it is connected to the clock input of multivibrator 123 will cause the outputs of that multivibrator to change state thus changing the output of AND gate 121 from $E_1$ to $E_2$ and thus ensuring that jitter in the range gate will not cause erroneous output signals to occur. The tenth of a mile signals are inhibited by inhibit gate 126 from passing through to the groundspeed voltage generator until the system switches to track.

The groundspeed voltage generator in FIG. 9 is comprised of one-shot multivibrator 127, buffer 128, analog switches 138 and 139, delay network 137, operational amplifier 133, capacitors 132 and 134, and resistors 129, 130, 131, 135, 140 and 141 and groundspeed indicator 136. The tenth of a mile signals are fed from NOR gate 126 to one-shot multivibrator 127 where they are converted into pulses of standard width, shown at the output of multivibrator 127 in FIG. 10. As indicated above, smoothing of the range gate position in filter 107, shown in FIG. 7 provides for a relatively smooth change of position signal which is not affected by erratic changes.

The duty cycle of the output pulse train of the multivibrator is proportional to groundspeed and basically the groundspeed generator is an integrating filter which integrates the pulses over a time period to provide a voltage value which is proportional to groundspeed. The groundspeed voltage generator also includes an initializing means which forces the output of the generator to some value preset by resistor 141 at the time of installation of the unit into the aircraft and which represents the average cruising speed thereof. Use of the initialization means permits the acquisition of accurate groundspeed data more rapidly than would otherwise be possible and also provides a groundspeed value which is displayed while the system is in search.

The groundspeed integration is performed by a double pole active low pass filter which is comprised of operational amplifier 133, capacitors 132 and 134 and resistors 129, 130, 131 and 135. During search the output of the search/track switch is high and the input to delay network 137 and to analog switches 138 and 139 is low. The analog switches are arranged to be closed when the input thereto is low and therefore while the system is in search switch 138 shorts capacitor 134 and switch 139 connects resistors 140 and 141 to the input of the operational amplifier.

The shorting of capacitor 134 isolates the output of buffer 128 from the input of the operational amplifier and since switch 139 is closed, the input to the amplifier is the initial groundspeed set on resistor 141. The relative values of the resistors of the filter are arranged so that in the initialization state with switches 138 and 139 closed the time constant is greatly reduced and the filter acts substantially as an amplifier. The initialization voltage set on resistor 141 is amplified in amplifier 133 (may have a gain of one) and is displayed on groundspeed indicator 136.

When the system switches to track, delay network 137 provides approximately a 15 second delay during which the initialized value is held. This delay can be charged and adjusted to suit individual system requirements. As the end of this time the output of delay network 137, which is fed to the inputs of analog switches 138 and 139, goes high thus opening the switches. The opening of switches 138 effectively re-connects capacitor 134 in the circuit and places the output of buffer 128 across the input to the filter. Since capacitor 134 had been shorted, when switch 138 is open there is no initial charge on the capacitor 134 which might leak into the rest of the circuit. Opening of switch 139 effectively disconnects the initial voltage value set on resistor 141 from the filter input. Hence after the end of the 15 second delay the change of range gate position data is integrated in the filter and the integrated level is fed to groundspeed indicator 136 where it is displayed.

Further, while we have described an illustrative embodiment of our invention, we wish it to be understood that we do not intend to be restricted solely thereto, but that we do intend to cover all modifications thereof which would be apparent to one skilled in the art and which come within the spirit and scope of our intention.

What is claimed is:

1. Apparatus for determining the distance from a DME transmitter-receiver to a DME station, said transmitter transmitting a jittered interrogation pulse train and said receiver receiving signals from said station which after decoding consist of replies to said transmitted pulses, replies to pulses transmitted by other DME transmitters and squitter, a cycle being the time interval beginning with each interrogation pulse and ending a predetermined duration later during which duration received signals are processed by the apparatus, comprising means for storing information indicative of the times of receipt of all signals received during a first cycle, means for determining whether any of said stored times of receipt are identical to the times of receipt of signals received during the cyles following said first cycle for a predetermined number of successive cycles beginning with the second cycle and for providing an information signal or signals indicative of all such times of receipt which are common for said predetermined number of successive cycles, and means for deriving a distance measurement signal from the signal indicative of the first occurring of said common times of receipt.

2. The apparatus of claim 1 wherein said means for determining includes means for deciding whether the times of receipt of any signals received during the second cycle are the same as said stored times of receipt, the common times if any defining a first group of one or more common times.

3. The apparatus of claim 2 wherein said means for determining further includes means for storing information indicative of the times of said first group of common times and includes means for deciding whether the times of receipt of any signals received during the third cycle are the same as any of said times in said first group of common times, the common times if any resulting from this decision defining a second group of one or more common times.

4. The apparatus of claim 1 wherein said predetermined number of successive cycles is two.

5. The apparatus of claim 3 wherein said means for determining includes a clock pulse generator for dividing each cycle into a plurality of intervals defined by clock pulses outputted by said generator, each said interval being indicative of a given distance and a shift register, said received signals being shifted through said register by said clock pulses so that they assume a position in the register corresponding to their time of receipt.

6. The apparatus of claim 5 wherein the number of clock pulses which each cycle is divided into is twice the number of storage positions of the shift register, and means for recirculating while examining the data loaded into the shift register during the second half of each cycle.

7. The apparatus of claim 6 wherein said means for examining comprises means for determining whether or not at least one received signal was in the shift register.

8. The apparatus of claim 7 wherein both said means for deciding include a coincidence gate means, the inputs of which are connected respectively to the output of said shift register and to a line being fed with said received signals or signals corresponding thereto.

9. The apparatus of claim 8 further including means responsive to said means for examining for determining whether said received signals are fed to said shift register through said coincidence gate means or are fed to said shift register without having to pass through said coincidence gate means.

10. The apparatus of claim 1 further including means responsive to the occurrence of at least one common time of receipt for said predetermined number of successive cycles for generating a gate during a cycle which occurs after said predetermined number of cycles have occurred at said common time of receipt, and means for combining said received signals with said gate in a coincidence detecting means.

11. The apparatus of claim 10 wherein the duration of said gate is a small fraction of the duration of a cycle.

12. The apparatus of claim 11 further including means for causing said range gate to repetitively be generated in successive cycles following the initial generation thereof even though no further common time of receipt for a predetermined number of successive cycles occurs.

13. The apparatus of claim 12 wherein the time of generation of said range gate is updated when the next occurrence of a common time of receipt for said predetermined number of cycles is detected.

14. The apparatus of claim 10 wherein said means for generating a gate causes said gate to be centered over said common time of receipt.

15. The apparatus of claim 14 wherein said means for generating a gate includes means for generating a double ramp signal, each of the ramps lasting for one half of a cycle, means for sampling one said ramps at the occurrence of said common time of receipt for a predetermined number of successive cycles and for generating and storing a D.C. voltage which is proportional to the magnitude of the ramp at sampling and means for comparing the other of said ramps in a cycle occurring after the cycle during which said sampling occurs with said D.C. voltage, and means responsive to said means for comparing for generating said gate when the magnitude of said other ramp becomes equal to said D.C. voltage.

16. The apparatus of claim 13 further including means connected to the output of said coincidence detecting means for determining when a predetermined minimum percentage of cycles have received signals falling within said range data and for switching said apparatus to the track state in response thereto.

17. The apparatus of claim 16 wherein the determination of said percentage is made over a fixed number of cyles.

18. The apparatus of claim 17 further including means for continuing said storing and said determining of common times of receipt while said percentage determination is taking place.

19. The apparatus to claim 16 further including means responsive to said apparatus being switched into said track state for allowing only those received signals falling within said gate to be fed to said means for storing and said means for determining.

20. The apparatus of claim 19 further including means responsive to said apparatus being switched to said track state for causing said predetermined number to be reduced.

21. The apparatus of claim 20 wherein said predetermined number originally was two and is reduced to one in the track state.

22. A method for determining the distance from a DME transmitter-receiver to a DME station, said transmitter transmitting a jittered interrogation pulse train and said receiver receiving signals from said station which after decoding consist of replies to said transmitted pulses, replies to pulses transmitted by other DME transmitters and squitter, a cycle being the time interval beginning with each interrogation pulse and ending a predetermined duration later during which duration received signals are processed by the apparatus, comprising the steps of storing information indicative of the times of receipt of all signals received during a first cycle, determining whether any of said stored times of receipt are identical to the times of receipt of signals received during the cycles following said first cycle for a predetermined number of successive cycles beginning with the second cycle, providing an information signal or signals indicative of all such times of receipt which are common for said predetermined number of successive cycles, and deriving a distance measurement signal from the signal indicative of the first occurring of said common times of receipt.

23. The method of claim 22 wherein said predetermined number of successive cycles is two successive cycles.

24. The method of claim 22 further including the steps of responsive to the occurrence of at least one common time of receipt for said predetermined number of successive cycles generating a gate during a cycle which occurs after said predetermined number of cycles have occurred and combining said received signals with said gate in a coincidence detecting means.

25. The method of claim 24 further including the steps of determining when a predetermined minimum percentage of cycles have received signals falling within said gate and switching said receiver to the track state in response thereto.

26. The method of claim 25 further including the step of allowing only those received signals falling within said gate to be subjected to said storing and determining steps after said receiver is switched to track.

* * * * *